Oct. 8, 1968 W. D. COCKRELL 3,405,255
CARD READER
Filed Oct. 23, 1964 7 Sheets-Sheet 1

FIG. 1a

INVENTOR.
WILLIAM D. COCKRELL
BY *James J. Williams*
HIS ATTORNEY

Oct. 8, 1968 W. D. COCKRELL 3,405,255
CARD READER

Filed Oct. 23, 1964 7 Sheets-Sheet 4

INVENTOR.
WILLIAM D. COCKRELL
BY *James G. Williams*
HIS ATTORNEY

INVENTOR.
WILLIAM D. COCKRELL
BY James J. Williams
HIS ATTORNEY

INVENTOR.
WILLIAM D. COCKRELL
BY James G. Williams
HIS ATTORNEY

FIG. 8

United States Patent Office 3,405,255
Patented Oct. 8, 1968

3,405,255
CARD READER
William D. Cockrell, Waynesboro, Va., assignor to General Electric Company, a corporation of New York
Filed Oct. 23, 1964, Ser. No. 405,971
12 Claims. (Cl. 235—61.11)

The invention relates to a card reader, and particularly to a card reader that can read or scan indicia on a business machine card attached to a moving object as the object and card pass the reader.

In some warehouse installations, objects are moved by means of conveyors along routes or to destinations in accordance with coded indicia on the objects. Such indicia may comprise squares of light and dark colors arranged in a predetermined code that indicates some fact or facts about the object, such as its content or destination. These squares are scanned by a photoelectric device which converts the scanned light and dark squares into electrical signals that can be used to control the route or destination of the objects. In such a system, the squares must be relatively large to insure proper scanning, such relatively large squares requiring a relatively large object such as a carton of goods or materials. Also, the necessity of relatively large squares may be unsuitable for systems which are designed to use business machine cards that are punched or marked.

Accordingly, an object of the invention is to provide an improved reading device.

Another object of the invention is to provide a reader capable of reading the inidcia on business machine cards attached to a moving object.

Another object of the invention is to position a business machine card attached to a moving object so that the card can be read or scanned as it moves.

Another object of the invention is to provide a device that positions itself to the location of a moving business machine card so that the moving card can be accurately scanned or read.

Another object of the invention is to scan or read a punched card fastened to a relatively light object.

Another object of the invention is to scan or read a marked card fastened to a relatively light object.

Briefly, these and other objects are achieved in accordance with the invention by a fixed guide and an upwardly biased movable guide. The card attached to the moving object is guided into the fixed guide which supports the card along its relatively small thickness dimension as it moves along its major plane. The card moves from the fixed guide into the movable guide which also supports the card along its relatively small thickness dimension. As the card moves along its major plane, a lower edge of the card contacts an edge guide on the movable guide and moves the edge guide and the movable guide downward so that the movable guide is accurately positioned relative to the lower edge of the card. As the movable guide is so positioned, the card can be accurately read or scanned.

The invention is particularly pointed out in the claims. The invention may be better understood from the following description given in connection with the accompanying drawing, in which:

FIGUE 3 shows a cross-sectional view taken along the lines 3—3 of FIGURE 2.

Figure 1A:
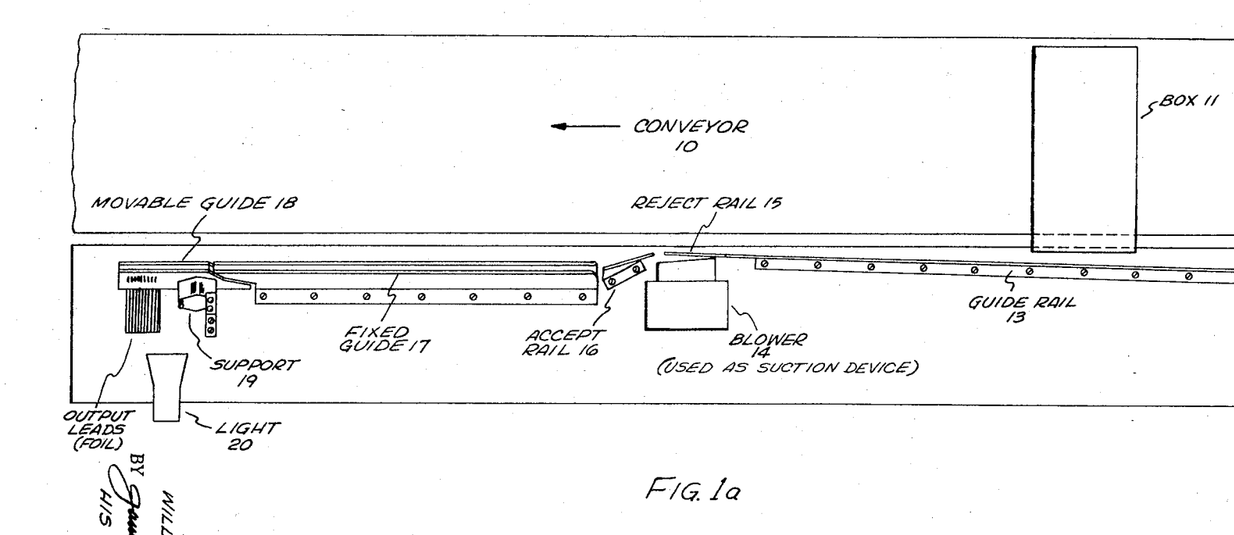
FIGURES 1a and 1b show plan and elevation views respectively of a conveyor and a card reader in accordance with the invention.
Figure 1B:
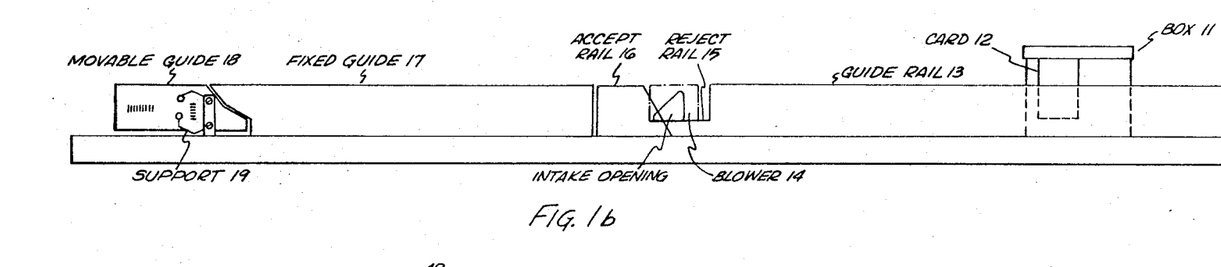

FIGURES 1a and 1b show plan and elevation views of a conveyor 10 and the card reader of the invention positioned on a suitable support beside the conveyor 10. The conveyor 10 may be any suitable device which moves and carries objects such as a shoebox 11. A business machine card 12 is fastened at its top to the box 11 so that it extends downward from its point of fastening. The business machine card 12 is punched or marked to indicate information about the contents of the box 11, such as the stock number, the size, the width, and the color of a pair of shoes. This information may be placed on the business machine card 12 which may be attached to the box 11 at the time the shoes are packed in the box 11. In some instances, a shoe-box containing a pair of ladies' shoes may be very light and weigh as little as 12 ounces. The card reader of the invention is designed to read the business machine card attached to this lightweight box of shoes without disturbing the operation of the conveyor carrying the box and without disturbing the position of the box on the conveyor. And while the invention has been shown in a particular application, namely where the busines machine cards are attached to a shoebox, it is to be understood that the card reader can be used to read or scan business machine cards fastened to almost any object, such as a coat hanger containing a lightweight garment. In a warehouse operation, the information on a card can be scanned or read and converted into electrical signals which are supplied to a computer. The computer can be supplied with information indicating what shoes are desired for one or more store orders. When a business machine card indicating a particular shoe is scanned and the information is supplied to the computer, the computer may respond by causing certain diverting gates or associated apparatus to function so that the shoebox 11 containing the desired pair of shoes is diverted to the desired location. Thus, a particular order for various quantities and qualities of shoes can be supplied to the computer. When supplied with information indicating desired shoes, the computer operates equipment which causes the box of desired shoes to be diverted or conveyed to a predetermined location at which the order is filled.

With reference to FIGURES 1a and 1b, the shoebox 11 moves along the conveyor 10 from right to left as indicated. The card 12 normally extends vertically downward from the top of the box 11. As the box 11 approaches the card reader, it passes a vertical guide rail 13 on the support. The guide rail 13 angles toward the conveyor 10 to make sure that the card 12 does not stick outwardly from the box 11. As the box 11 continues past the guide rail 13, it passes a blower 14. The blower 14 sucks or draws the lower portion (not fastened) of the card 12 away from the box 11. If the card 12 has been improperly fastened to the box 11 so that it extends too far downward, the blower 14 cannot draw the lower portion of the card 12 away from the box 11 because of a vertical reject rail 15. The reject rail 15 is an extension of the guide rail 13. As seen best in FIGURE 1b, the reject rail 15 has a lower height than the guide rail 13. If the card extends below the top edge of the reject rail 15, the blower 14 is arranged so that it cannot draw the card 12 away from the box 11. However, if the card 12 does not extend too far downward, the blower 14 can draw the lower portion of the card 12 away from the box 11. The card 12 is held away from the box 11 by an accept rail 16. FIGURE 1b shows a desired shape of intake opening for the blower 14. This intake opening is preferably greatest at the approach side so that greater suction or force is exerted on a card 12 as it approaches the blower 14. This has been found satisfactory because more force is needed to separate the lower portion of the card 12 from the box 11 than is required to hold the lower portion of the card 12 so separated. The accept rail 16 is preferably triangularly shaped as shown in FIGURE 1b so as to provide a better edge or surface for guiding the lower portion of the card 12 away from the box 11. The accept rail 16 also slopes toward the conveyor 10 at an angle of approximately 15 degrees from the vertical. However, other slope angles may be satisfactory.

As the box 11 continues to move along the conveyor 10, the accept rail 16 guides the accepted card 12 into a fixed guide 17 which comprises two parallel walls or plates which are preferably positioned at the same slope angle as the accept rail 16. The approach end of each wall of the fixed guide 17 may be flared outward as shown in FIGURE 1a to facilitate entry of the leading edge of the card 12 between the walls or plates of the fixed guide 17. The inner surfaces of the walls of the fixed guide 17 are spaced relatively close to one another so as to support the major plane of the card 12 and at the same time permit the relatively small thickness dimension of the card 12 to pass between the inner surfaces. In one embodiment actually built, the inner surfaces of the walls or plates of the fixed guide 17 were separated by approximately 0.032 inch.

As the box 11 is moved by the conveyor 10, the card 12 passes from the fixed guide 17 to a movable guide 18. The movable guide 18 is arranged to move relative to the card reader support. The movable guide 18 comprises two walls or plates which are substantially the same as and parallel to the two walls of the fixed guide 17. The two plates of the movable guide 18 are held in position by an inner or spacer plate which has a surface which the lower edge or corner of the card 12 contacts or rides on. The movable guide 18 is preferably positioned at the same slope angle as the fixed guide 17 and the accept rail 16. As shown in FIGURE 1b, the fixed guide 17 and the movable guide 18 are arranged so that as the card 12 passes from the fixed guide 17 to the movable guide 18, it passes through a gradual transition rather than passing abruptly from the fixed guide 17 to the movable guide 18. If desired, the movable guide 18 may have its two outer plates flared outward to facilitate entry of a card 12 into the movable guide 18. The movable guide 18 is movably held by a support 19 which permits the movable guide 18 to move downward and to the left (in the plane of its plates) in response to the lower edge or corner of a card 12 contacting the inner or spacer plate of the movable guide 18. As the card 12 passes between the outer plates of the movable guide 18, the lower corner or edge of the card 12 contacts the spacer in the movable guide and moves the movable guide downward. This motion can be provided by a relatively thin card because the card is supported along its thickness dimension by the outer plates of the movable guide 18 so that the card 12 has strength and acts as a beam. At a predetermined location, the card 12 may be read or scanned by suitable light sensitive devices in association with a light 20 shown in FIGURE 1a. The movable guide 18 may carry scaning devices which can be connected to external circuits by means of output leads which are preferably very flexible and light. In an actual embodiment, it was found that foil type conductors embedded in light plastic provided leads which were light and flexible.

Figure 2:
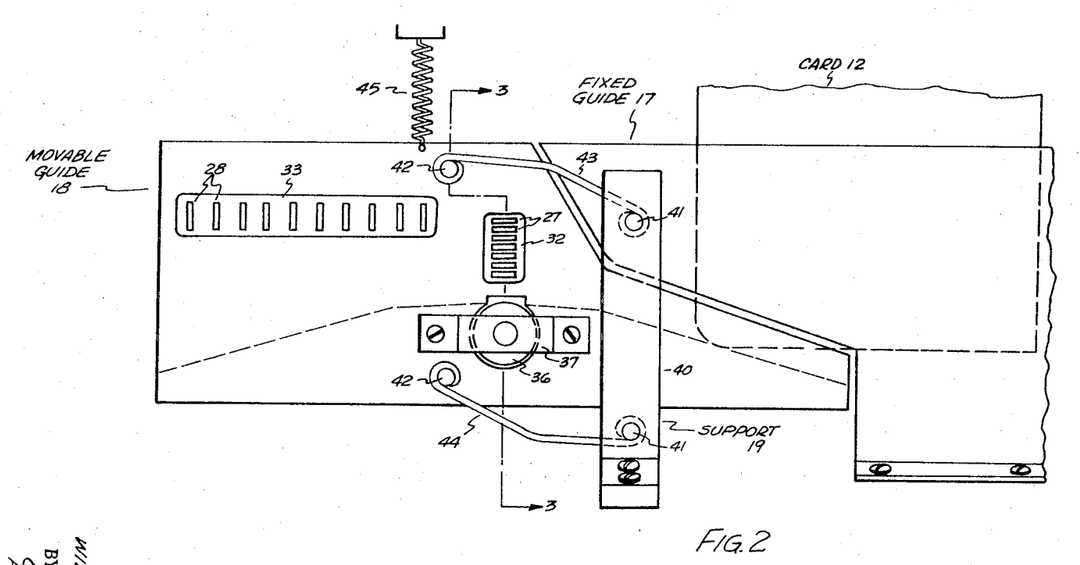
FIGURE 2 shows a more detailed view of the movable guide and a portion of the fixed guide of the card reader in accordance with the invention.
Figure 3:
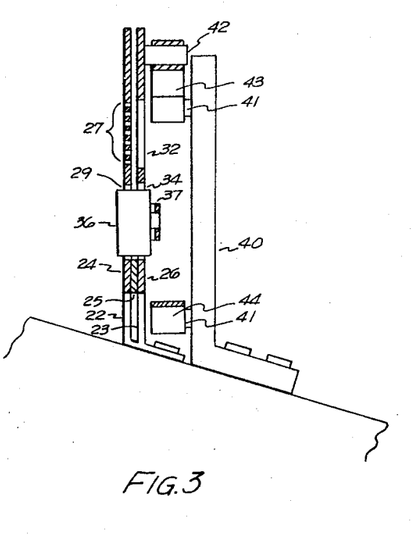
Figure 4A:
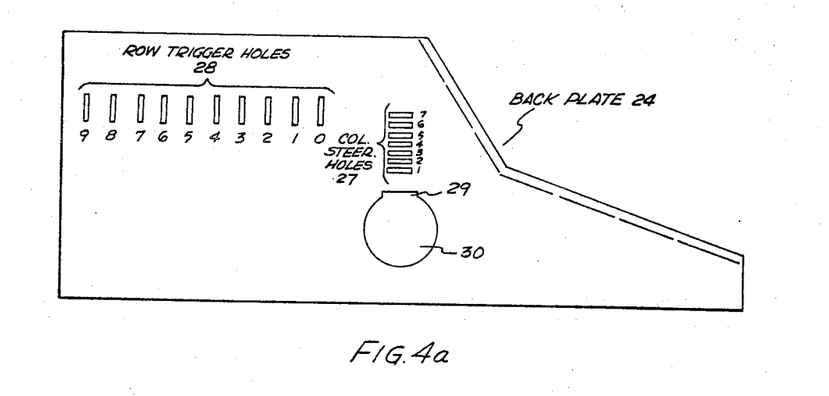
FIGURES 4a, 4b, and 4c show detailed views of the plates which form the movable guide of the invention.
Figure 4B:
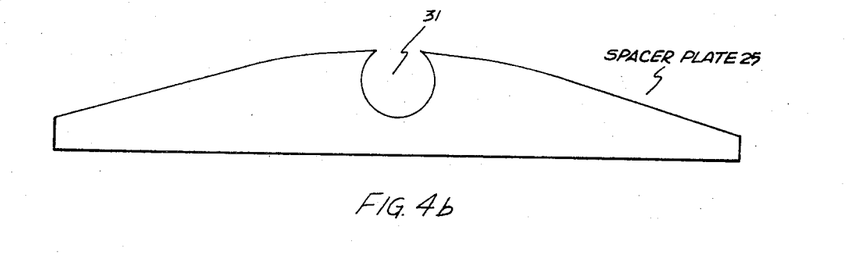
Figure 4C:
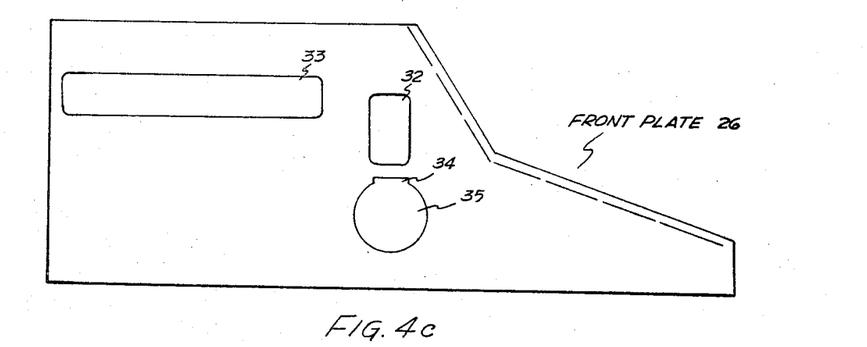

FIGURES 2 and 3 show more detailed views of part of the fixed guide 17 and the movable guide 18, FIGURE 3 being a cross-sectional view taken along the lines 3—3 in FIGURE 2. The fixed guide 17 comprises a back plate 22 and a front plate 23 which can be seen in the lower part of FIGURE 3. The movable guide 18 comprises a back plate 24, a spacer or inner plate 25, and a front plate 26. In addition to being shown in FIGURES 2 and 3, these plates 24, 25, 26 are respectively shown in FIGURES 4a, 4b, and 4c. These plates are formed of suitable light material, such as aluminum having a thickness of 0.032 inch. Thus, in the same embodiment mentioned above, the inner surfaces of the walls or plates 24, 26 of the movable guide 18 were also separated by approximately 0.032 inch. The back plate 24 is provided with seven column steering holes 27 for permitting light to reach respective light sensitive devices positioned behind and on the back plate 24. The back plate 24 is also provided with ten row trigger holes 28 for permitting light to reach respective light sensitive devices positioned behind and on the back plate 24. The back plate 24 also includes a tilt hole 29 with a light sensitive device positioned behind and on the back plate 24. A roller hole 30 is also provided in the back plate 24. The back plate 24 may be flared outward along the dashed and dotted lines shown in FIGURE 4a. The spacer plate 25, having a good bearing and long-wearing surface, is shaped to provide a card edge guide or cam, and is provided with a roller hole 31. The front plate 26 is provided with a steering aperture 32, a trigger aperture 33, and tilt and roller apertures 34, 35. The front plate 26 may also be flared outward along the dashed and dotted lines shown in FIGURE 4c. The back and front plates 24, 26 have the same general shape or outline and are suitably fastened together with the spacer plate 25 between them. As shown in FIGURE 2, the steering and trigger apertures 32, 33 expose the steering and trigger holes 27, 28 respectively. As shown in FIGURES 2 and 3, a card roller 36 having a diameter slightly less than the diameter of the roller holes 30, 31 and the roller aperture 35 is held in holes 30, 31 and aperture 35 by a suitable bracket 37 which may be fastened to the front plate 26. As shown in FIGURE 2, the upper surface of the card roller 36 is preferably positioned in line with the uppermost part of the edge guide or cam surface of the spacer plate 25. The card roller 36 is sufficiently long so that it extends slightly beyond the back and front plates 24, 26 as shown in FIGURE 3.

FIGURE 2 shows the shape of the common ends of the fixed guide 17 and the movable guide 18 and shows how the card 12 gradually leaves the fixed guide 17 and enters the movable guide 18. These common ends are sloped so that the card 12 receives appreciable support from the fixed guide 17 as the card 12 contacts the spacer plate 25. These sloped ends also help to prevent jamming which might occur if the leading edge of the card 12 entered the movable guide 18 along its entire length at the same time. The movable guide 18 is held by the support 19 which comprises a bracket 40 fastened to the reader support so as to extend upward at the same angle as the fixed and movable guides 17, 18. Bracket pins 41 are fastened to the bracket 40 and guide pins 42 are fastened to the front plate 26 of the movable guide 18 so that the distance between the guide pins 42 is equal to the distance between the bracket pins 41. The upper bracket pin 41 is connected to the upper guide pin 42 by an upper arm 43, and the lower bracket pin 41 is connected to the lower guide pin 42 by a lower arm 44. The upper and lower arms 43, 44 are equal in length. Thus, it will be seen that the support 19 provides a four-bar linkage. This linkage permits the movable guide 18 to move in its plane and the major plane of the card 12 along a circle. This circular motion is desirable since it permits the movable guide 18 to move to the left and downward as viewed in FIGURE 2 when the card 12 contacts the spacer plate 25.

The support 19 may also take other forms. For example, the support 19 may comprise two radial arms which pivot about a horizontal pin and which are fastened to the movable guide 18 so that the movable guide 18 swings radially about the horizontal pin. However, such a support does not maintain the movable guide 18 in a single plane, since it pivots about a radius. Or, the support 19 may comprise vertical arms on which movable bushings attached to the movable guide 18 may slide up and down. However, such a support does not permit the movable guide 18 to move to the left when a card 12 contacts the spacer plate 25.

The movable guide 18 is held slightly spaced from the fixed guide 17 as shown in FIGURE 2 by a suitable bias spring 45 which tends to pull the movable guide 18 upward in the plane of the movable guide surfaces. The spring 45 shown in FIGURE 2 is preferably a relatively long tension spring which provides a substantially constant force for each increment of displacement of the movable guide 18. However, other types of springs can be provided. For example, a torsion spring can have one end fastened to the card reader support and have its other end fastened to the movable guide 18 to exert an upward force on the movable guide 18.

With particular reference to FIGURE 2, as the card 12 carried by the box 11 is moved by the conveyor 10, the card 12 passes between the back and front plates 22, 23 of the fixed guide 17. As the card 12 continues to move, its leading and lower edges leave the fixed guide 17 and enter the movable guide 18. At some point, the leading, lower corner of the card 12 contacts the cam surface of the spacer plate 25. Since the card 12 is positioned between the back and front plates 22, 23 of the fixed guide 17 and between the back and front plates 24, 26 of the movable guide 18, it has considerable strength and can act as a beam. Since the movable guide 18 is relatively light and biased relatively lightly, the leading, lower corner of the card 12 causes the spacer plate 25 to move outward or to the left and downward, carrying the movable guide 18 along with it. The four-bar linkage provided by the support 19 permits both leftward and downward movement, and thus decreases the resistance or initial impact shock applied to the card 12 when it first contacts the spacer plate 25. The leftward movement of the movable guide 18 is provided because the upper and lower guide pins 42 are respectively higher in elevation than the upper and lower bracket pins 41. This relative position permits a radial movement about the pins 41 that is to the left as well as down. As the card 12 continues its movement to the left, it passes over the card roller 36 at which time the card is read or scanned.

Figure 5:
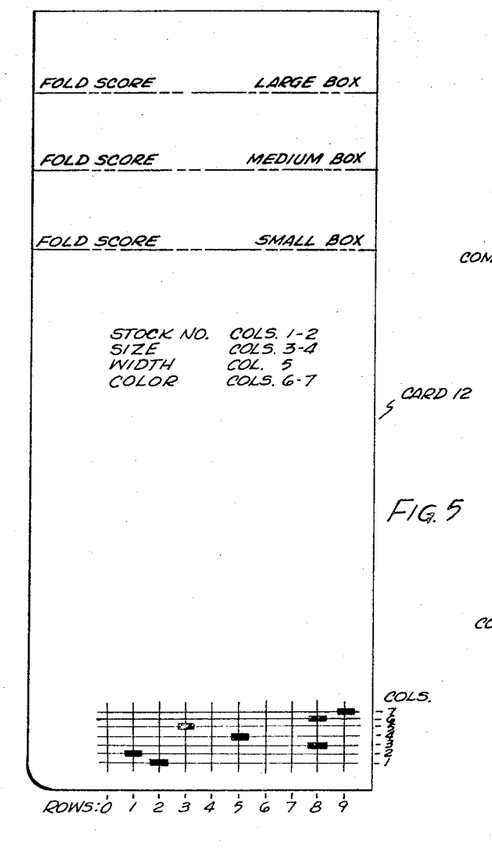
FIGURE 5 shows a business machine card which is read or scanned by the card reader in accordance with the invention.

FIGURE 5 shows a business machine card representative of the type of card that the code reader of the invention is designed to read or scan. The card shown in FIGURE 5 is a typical business machine card measuring approximately 7⅜ inches in length, 3¼ inches in width, and 0.007 inch in thickness. The lower, leading corner of the card may be rounded. Usually, such a card comprises ten rows spaced on 0.25 inch centers across the card width and having the numerical significance of 0 through 9; and a number of columns spaced on 0.085 inch centers across the card length. The card of FIGURE 5 is provided with seven columns which, for the illustrated embodiment in this application, have the following indications: shoe stock number, columns 1 and 2; shoe size, columns 3 and 4; shoe width, column 5; and shoe color, columns 6 and 7. Additional columns can be provided on the card, but only seven columns are shown in order to keep the explanation relatively simple. The card can be punched or marked with small rectangles at the intersections of the rows and columns to provide the desired indicia which indicates certain qualities of the shoes. In FIGURE 5, columns 1 and 2 indicate a shoe stock number 21 since column 1 is punched at row 2 and column 2 is punched at row 1. Columns 3 and 4 indicate a shoe size of 8½ since column 3 is punched at row 8 and column 4 is punched at row 5. Column 5 indicates a width of 3, which, according to any predetermined code, may indicate a shoe width in alphabetical letters. And finally, columns 6 and 7 indicate a color of 89 since column 6 is punched at row 8 and column 7 is punched at row 9. This numeral 89 can indicate any predetermined color in accordance with some predetermined code. The card may be scored along with the width dimension as indicated so that a person applying these cards to shoeboxes can fold the card and hang the fold over the rim of the box so that the lower card edge is positioned as nearly as possible to the desired elevation with respect to the card reader. The card can be fastened or stapled to the box near the fold so that the lower portion of the card can be guided into the card reader.

Figure 6A:
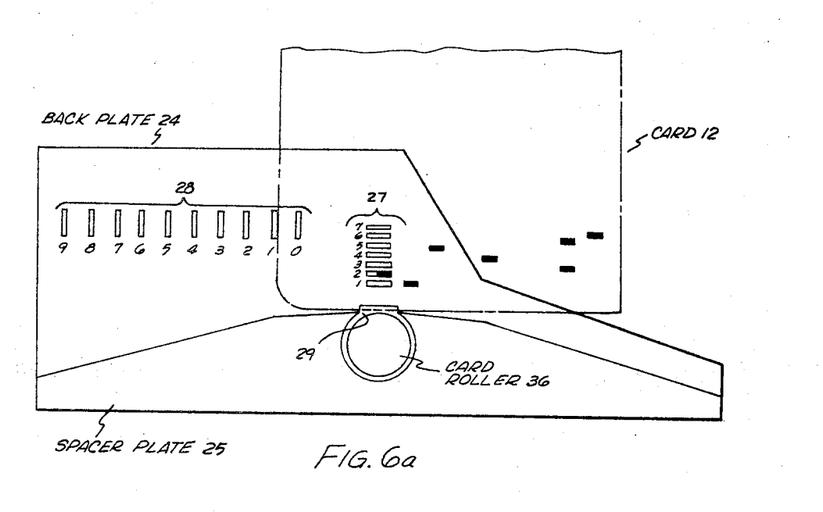
FIGURES 6a and 6b show views of a business machine card correctly and incorrectly positioned relative to the movable guide of the invention.
Figure 6B:
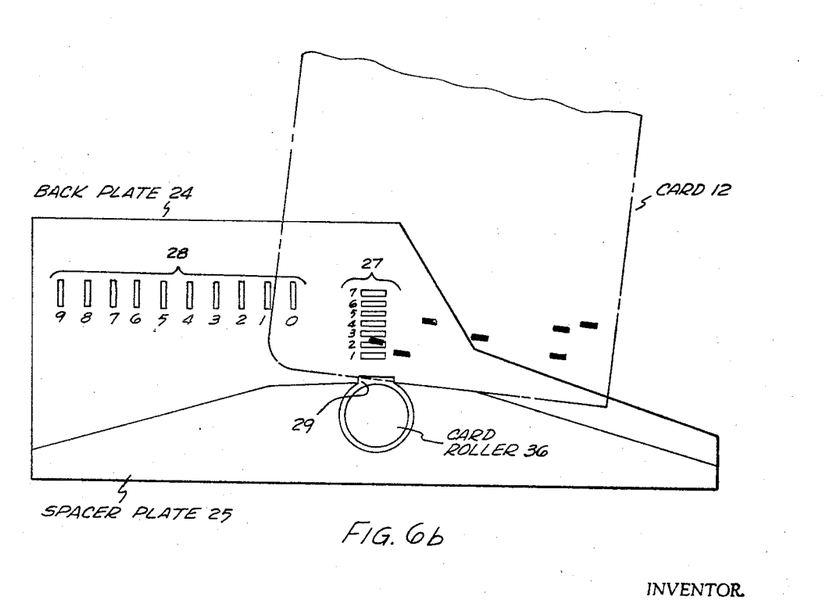

FIGURES 6a and 6b respectively show views of the card 12 of FIGURE 5 positioned correctly and incorrectly with respect to the back plate 24 and the spacer plate 25 of the movable guide 18. In FIGURE 6a, the card 12 has moved to the position where the indicia of row 1 is over the steering holes 27, and specifically the second column steering hole 27. The steering holes 27 and the trigger holes 28 are arranged so that the indicia of each row is over the steering holes 27 just prior to the time that the leading edge of the card 12 covers the respective trigger hole 28 for each row. Thus, with the indicia for row 1 over the steering holes 27, the front edge of the card 12 is about to cover the trigger hole 28 for row 1. With the card 12 in this position, light from the light 20 passes through the steering aperture 32, through the hole in row 1 of the card 12, and through the steering hole 27 for column 2. A suitable photoelectric device behind the steering hole 27 for column 2 will receive light. This device provides a steering signal for a multivibrator as will be explained. Shortly afterward, the leading edge of the card 12 passes over or covers the trigger hole 28 for row 1. This prevents light from reaching a photoelectric device behind the hole 28 for row 1 so that the device provides a trigger signal for a multivibrator as will be explained. It will also be noticed in FIGURE 6a that the lower edge of the card touches the card roller 36 so that light may not pass through the tilt hole 29. Thus, light does not reach the photoelectric device behind this tilt hole 29.

FIGURE 6b shows the card 12 incorrectly positioned with respect to the back plate 24 and the spacer plate 25 of the movable guide 18. While it is possible that light may reach the photoelectric device behind the steering hole 27 for column 2, the position of the hole in the card 12 is not accurately over the hole 27 for column 2. Such inaccuracy of position may provide an erroneous reading. The card 12 shown in FIGURE 6b has been applied to the box incorrectly in a canted or improper position. In order that an improperly positioned card is not read, the tilt hole 29 and a photoelectric device are arranged so that light which passes through the tilt hole 29 and reaches the photoelectric device behind this tilt hole 29 provides an error signal. As will be explained, if any one of the trigger holes 28 is covered so that light does not reach its corresponding photoelectric device (this condition indicating the presence of a card), and if light does reach the photoelectric device behind the tilt hole 29 (this condition indicating an improperly positioned card), this combination of circumstances may operate electrical circuits so that information on the card causing this condition is not utilized and the object carrying the card may be rejected.

Figure 7A:
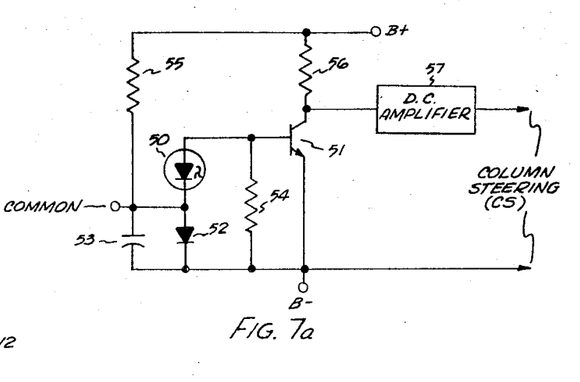
FIGURES 7a and 7b show circuit diagrams for light sensitive devices which can be used with the movable guide of the invention.
Figure 7B:
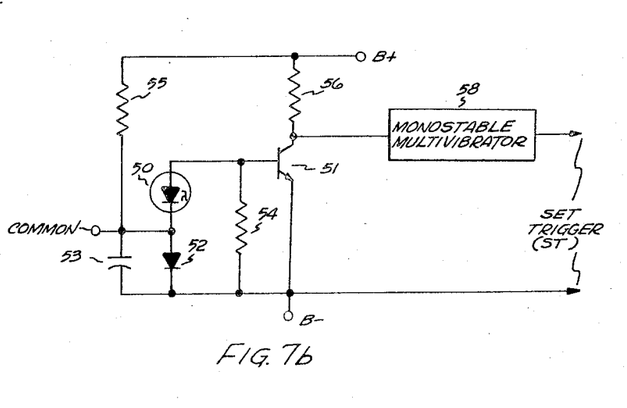

FIGURE 7a shows an electrical circuit which may be used with each of the photoelectric devices associated with the steering holes 27 and the tilt hole 29, and FIGURE 7b shows an electrical circuit which may be used with each of the photoelectric devices associated with the trigger holes 28. Since lightness is important, a suitable photoelectric device may be a conventional solar cell 50 indicated by a diode and the symbol λ enclosed in a circle. As known in the art, the solar cell 50 produces electrical current in response to light striking the cell 50. In FIGURE 7a, the anode of the solar cell 50 is coupled to the base of an NPN type transistor 51. The cathode of the solar cell 50 is coupled to a biasing diode 52. The cathode of the solar cell 50 may be coupled in a common circuit, as indicated, with the cathodes of the other solar cells associated with the steering holes 27 to reduce the number of electrical leads. A capacitor 53 is coupled in parallel with the biasing diode 52. A resistor 55 is coupled between the cathode of the solar cell 50 and the positive terminal B+ of a source of direct current. A resistor 54 is coupled between the base and emitter of the transistor 51, and a resistor 56 is coupled between the collector of the transistor 51 and the terminal B+. The emitter of the transistor 51 is coupled to the negative terminal B— of the source of direct current. The output is derived from the collector of the transistor 51 and may be amplified in a DC amplifier 57 to provide a column steering signal CS which is supplied to a storage circuit, or a tilt signal which can operate a reject circuit. The circuit of FIGURE 7a is arranged so that when light strikes the solar cell 50, a positive-going signal is provided.

The circuit of FIGURE 7b for the trigger holes 28 is substantially identical to the circuit shown in FIGURE 7a. The only difference is that the output of the circuit of FIGURE 7b is derived from a monostable multivibrator 58 which produces a positive-going pulse of some predetermined time duration in response to light being removed from the solar cell 50. This pulse serves as a set trigger signal ST.

Figure 8:
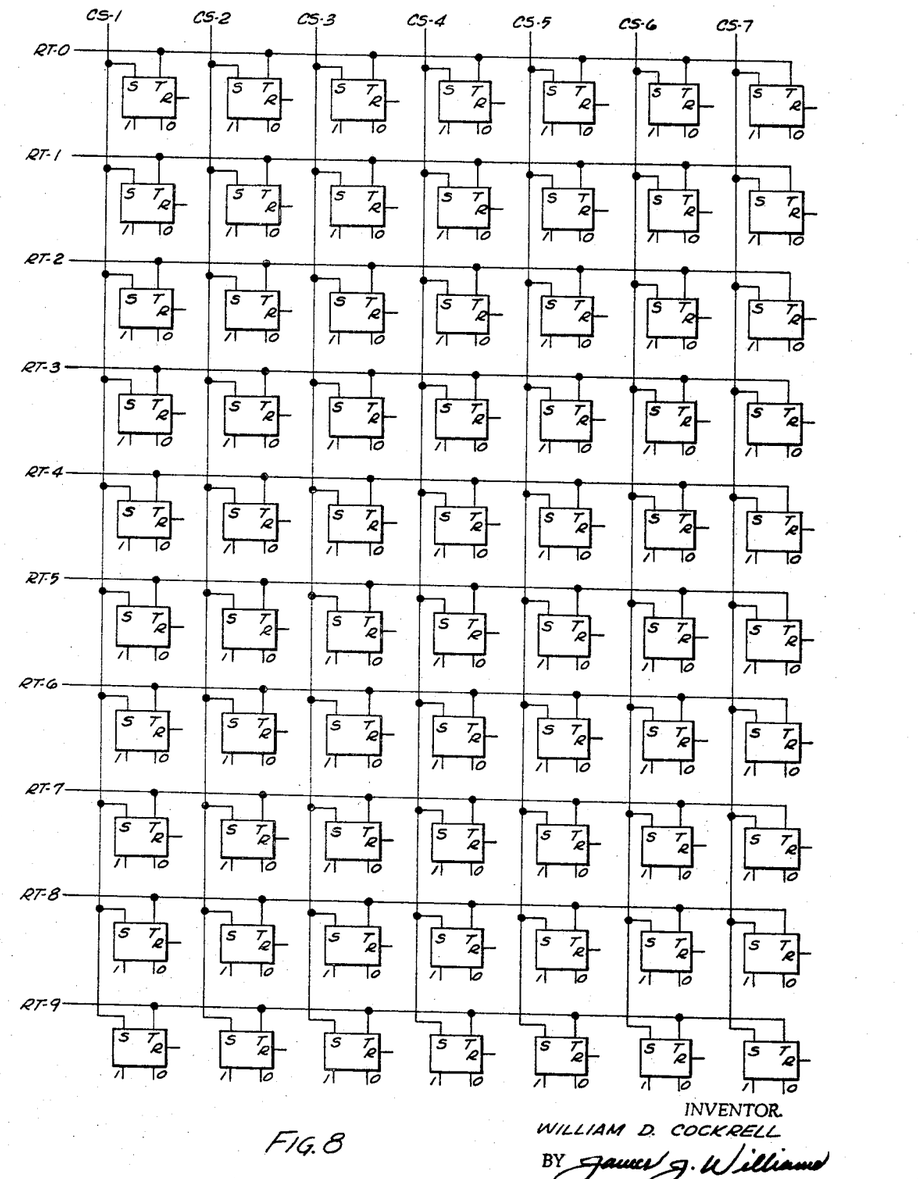
FIGURE 8 shows a block diagram of a storage circuit for receiving and storing information derived from the scanning devices associated with the movable guide.
Figure 9:
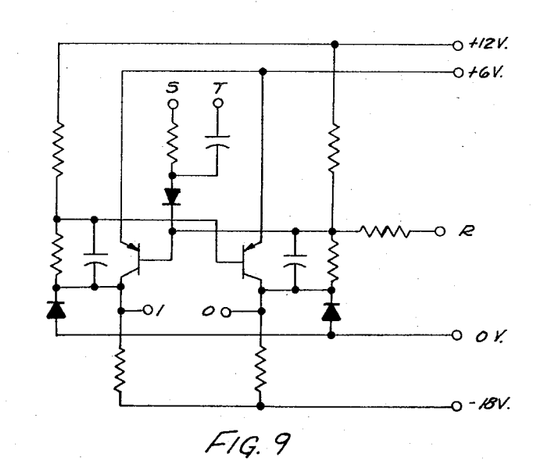
FIGURE 9 shows a schematic diagram of a flip-flop which can be used in the storage circuit of FIGURE 8.

FIGURE 8 shows a suitable storage circuit to which the column steering signals CS and the set trigger signals ST can be supplied. Since the business machine card contemplated in the embodiment shown has ten rows, there are ten rows, 0 through 9, of flip-flops. Each of these ten rows of flip-flops comprises seven flip-flops, there being one flip-flop for each of the seven columns assumed in the embodiment being explained. Each of the flip-flops indicated by a block in FIGURE 8 may have a circuit such as shown in FIGURE 9. The circuit of FIGURE 9 is a known flip-flop or multivibrator circuit comprising two PNP type transistors coupled in bistable fashion. The outputs for the flip-flop of FIGURE 9 are derived from the one terminal and the zero terminal respectively. The inputs for the flip-flop are a steering terminal S, a trigger terminal T, and a reset terminal R. The flip-flop is set in response to a positive-going steering signal applied to terminal S followed by a positive-going trigger signal applied to the terminal T. The flip-flop may be reset in response to a zero or negative-going signal applied to the reset terminal R. Generally, all flip-flops of FIGURE 8 would be reset just prior to a card being read or scanned. As a card is read or scanned, appropriate row and column flip-flops are steered and triggered to be set so as to indicate the row and column indicia on the card. Subsequently, this information could be used in any manner desired, such as the computer arrangement mentioned earlier. If the solar cell associated with the tilt hole 29 receives light, and at the same time if one or more of the trigger holes 28 is covered so that one or more associated solar cells does not receive light, a suitable logic circuit can provide an indication in response to this condition so that no information from the card causing this condition is utilized.

It will thus be seen that the invention provides a novel and improved card reader which can read or scan business machine cards associated with a moving object. The light plates, the small solar cells, and the light foil leads provide a movable guide 18 that is light, and hence easily and rapidly moved by a card. And the four-bar linkage reduces resistance of the movable guide 18 to the card. While the invention has been described in a particular embodiment, modifications may be made. For example, the cards being read may be associated with any sort of objects. And, the card reader may have different forms. For example, it is possible that the fixed guide 17 may be omitted and the card guided directly into the movable guide 18. The movable guide 18 may also be supported in different ways. The transistion slope between the fixed guide 17 and the movable guide 18 may be changed. And, the movable guide 18 may be provided with different types of biasing arrangements. Also, the card may be guided into the fixed guide 17 or the movable guide 18 by means other than the blower 14. For example, some sort of knife edge arrangement could be used to withdraw the lower portion of the card from the object so that the card is guided into the fixed and movable guides. And finally, the indicia on the card may be read by reflected light as well as by light which passes through the card. In this case, a suitable lens could display the indicia at the proper time on a grid of photoelectric devices. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A device for scanning indicia on a card attached by a portion thereof to a moving object comprising a movable guide having two plates, held in close spaced relation by a spacer plate, and between which said card may pass along the plane of said card, said movable guide being movable in said plane in response to an edge of said card contacting said spacer plate.

2. A device for scanning indicia on a card attached by a portion thereof to a moving object comprising a mechanically biased movable guide having two plates, held in relatively close spaced relation by a spacer plate, and between which said card may pass along the plane of said card, said movable guide having scanning apparatus and moving in said plane in response to an edge of said card contacting an edge of said spacer plate.

3. A card reading device for a card that has relatively large length and width and relatively small thickness and that is fastened at a part thereof to a movable object comprising a pair of substantially parallel surfaces that are fixed with respect to each other and that are positioned to receive said card and to guide the thickness of said card between said pair of surfaces; and a guide positioned between said surfaces and presenting a cam surface that is contacted by an edge of said card, said pair of surfaces and said guide moving in response to an edge of said card contacting said cam surface.

4. A card reading device for a card that has relatively large length and width and relatively small thickness and that is fastened at a part thereof to a movable object comprising a pair of substantially parallel surfaces that are fixed with respect to each other and that are positioned to receive said card and to guide the thickness of said card between said pair of surfaces; reading means fastened to said pair of surfaces; and a guide having a cam surface positioned between said pair of surfaces at a predetermined position relative to said reading means, said card reading device being movable in response to an edge of said card contacting said cam surface and positioning said reading means in a predetermined position relative to said card.

5. A device for positioning and reading a card that is fastened to a moving object so that the major plane of said card formed by the length and width of said card is substantially parallel to the direction of motion of said object and so that a portion of said card is free to move relative to said object comprising a movable guide for receiving said moving card and for fixing the position of a portion of said major plane of said card; an edge guide fastened to said movable guide at a position so that, while the position of a portion of said major plane of said card is fixed, an edge of said card may contact said edge guide and move said movable guide to a predetermined position relative to said card edge; and reading means fastened to said movable guide for reading said card while said movable guide is at said predetermined position relative to said card edge.

6. A device for positioning and reading a card that is fastened to a moving object so that the major plane of said card formed by the length and width of said card is substantially parallel to the direction of motion of said object and so that a portion of said card is free to move relative to said object comprising a first guide that is fixed relative to said moving object for receiving said moving card and fixing the position of a portion of said major plane of said card; a mechanically biased second guide for receiving said moving card from said first guide, said second guide fixing the position of a portion of said major plane of said card and being movable along said major plane; an edge guide fastened to said second guide at a position such that, while the position of a portion of said major plane of said card is fixed, an edge of said card may contact said edge guide and move said second guide against said mechanical bias to a predetermined position relative to said card edge; and reading means fastened to said second guide for reading said card while said second guide is at said predetermined position relative to said card edge.

7. A mechanism for positioning an indicia reader for a card fastened along a portion thereof to a moving object comprising a movable guide having first and second substantially parallel plates between which said card is guided and positioned as said object passes said movable guide, said movable guide being movable in a direction substantially parallel to said first and second plates; an edge guide fastened between said first and second plates and positioned to present a cam for an edge of said card; means urging said movable guide toward said edge of said card whereby said card positions said movable guide and said edge guide relative to said edge of said card; and an indicia reader fastened to said movable guide at a predetermined position relative to said edge guide.

8. A mechanism for positioning an indicia reader for a card fastened along a portion thereof to a moving object comprising a fixed guide having first and second surfaces which are substantially parallel and separated, and between which said card is guided and positioned as said object passes said first guide; a movable guide having first and second surfaces which are substantially parallel to said first and second surfaces respectively of said fixed guide and between which said card is guided and positioned after said object passes said fixed guide and as said object passes said movable guide, said movable guide being supported by a support that permits motion in a direction substantially parallel to said first and second surfaces; an edge guide fastened to said movable guide at a location at which said edge guide is contacted by an edge of said card; means urging said movable guide and said edge guide toward said edge of said card whereby said card positions said movable guide and said edge guide relative to said edge of said card; and an indicia reader fastened to said movable guide at a predetermined position relative to said edge guide.

9. The invention defined in claim 8 wherein said movable guide support comprises a four-bar linkage.

10. A mechanism for positioning an indicia reader for a card fastened along a portion thereof to a moving object comprising a movable guide having first and second substantially parallel plates between which said card is guided and positioned as said object passes said movable guide, said plates of said movable guide being sloped at an angle from a vertical plane and being movable in a direction substantially parallel to said first and second plates; a spacer plate fastened between said first and second plates, said spacer plate having an edge surface that begins at the lower approach portion of said first and second plates and slopes upwardly therefrom to a maximum height, and that slopes downward from said maximum height toward the lower trailing edge of said first and second plates to present a cam for an edge of said card; means urging said movable guide toward said edge of said card whereby said edge of said card positions said movable guide relative to said edge of said card; photoelectric means fastened to said movable guide at a predetermined position relative to said cam of said spacer plate for reading said indicia on said card; and further photoelectric means for indicating the angle of said edge of said card with respect to said maximum height.

11. A device for positioning an indicia reader for a card fastened along a portion thereof to a moving object comprising means for guiding said card away from said object; a movable guide having first and second plates between which said card is guided by said guiding means and between which said card is positioned as said object passes said movable guide, said movable guide being supported so that it is capable of moving in a direction substantially parallel to the plane of said card; an edge guide fastened between said first and second plates and arranged to present a cam for an edge of said card that slopes from lower levels at the ends of said plates toward a higher level at a point intermediate said ends of said plates; means urging said movable guide toward said edge of said card whereby said card positions said movable guide as said card edge contacts said cam; and an indicia reader fastened to said movable guide at a predetermined position relative to said edge guide.

12. A device for positioning an indicia reader for a card fastened along a portion thereof to a moving object comprising means for guiding said card away from said object; a movable guide having first and second plates between which said card is guided by said guiding means and between which said card is positioned as said object passes said movable guide, said movable guide being supported so that it is capable of moving in a direction substantially parallel to the plane of said card; an edge guide fastened between said first and second plates and arranged to present a cam for an edge of said card that slopes from lower levels at the ends of said plates toward a higher level at a point intermediate said ends of said of said card whereby said card positions said movable guide as said card edge contacts said cam; means for indicating the orientation of said card edge as said card edge contacts said higher level of said cam; and an indicia reader fastened to said movable guide at a predetermined position relative to said edge guide.

References Cited

UNITED STATES PATENTS

| | | | |
|---|---|---|---|
| 2,315,659 | 4/1943 | Russell | 186—1 |
| 2,985,276 | 5/1961 | Understadt | 188—90 |
| 2,988,355 | 6/1961 | Rabinow et al. | 271—2 |

DARYL W. COOK, *Primary Examiner.*